(12) United States Patent
Sun et al.

(10) Patent No.: US 8,717,975 B2
(45) Date of Patent: May 6, 2014

(54) METHOD FOR CONFIGURING A PREAMBLE AND A METHOD FOR SEARCHING A CELL

(75) Inventors: Changyin Sun, Shenzhen (CN); Wenhuan Wang, Shenzhen (CN); Min Liu, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 762 days.

(21) Appl. No.: 12/989,982

(22) PCT Filed: Dec. 31, 2008

(86) PCT No.: PCT/CN2008/073906
§ 371 (c)(1),
(2), (4) Date: Oct. 28, 2010

(87) PCT Pub. No.: WO2009/132502
PCT Pub. Date: Nov. 5, 2009

(65) Prior Publication Data
US 2011/0064032 A1    Mar. 17, 2011

(30) Foreign Application Priority Data

Apr. 30, 2008    (CN) .......................... 2008 1 0088722

(51) Int. Cl.
*H04W 4/00*    (2009.01)
(52) U.S. Cl.
USPC ......................................... 370/328; 370/208
(58) Field of Classification Search
CPC .... H04J 11/00–11/0093; H04W 80/00–80/12; H04W 84/12; H04W 92/00–92/24; H04W 84/00–84/16
USPC .................. 370/310–350, 203, 208
See application file for complete search history.

(56) References Cited

U.S. PATENT DOCUMENTS

| | | | |
|---|---|---|---|
| 6,618,452 | B1 | 9/2003 | Huber |
| 8,315,330 | B2 * | 11/2012 | Moon et al. .................. 375/295 |
| 2006/0034397 | A1 * | 2/2006 | Lee et al. ...................... 375/340 |
| 2006/0109780 | A1 | 5/2006 | Fechtel et al. |
| 2008/0095195 | A1 * | 4/2008 | Ahmadi et al. ............... 370/478 |
| 2009/0161591 | A1 * | 6/2009 | Ahmadi et al. ............... 370/312 |

FOREIGN PATENT DOCUMENTS

| | | |
|---|---|---|
| CN | 1777167 A | 5/2006 |
| CN | 1909536 A | 2/2007 |
| WO | 2008049028 A1 | 4/2008 |

OTHER PUBLICATIONS

IEEE P802.11n™/D2.00, Feb. 2007, pp. 1,8,130,212,308.*
European Patent Office, "Supplementary European Search Report", for European Application No. 08874089, Feb. 21, 2013.

* cited by examiner

*Primary Examiner* — Andrew Chriss
*Assistant Examiner* — Kenan Cehic
(74) *Attorney, Agent, or Firm* — Christopher L. Parmelee; Walker & Jocke (57) ABSTRACT

The present invention provides a method for configuring a preamble and a method for searching a cell, wherein the method for configuring a preamble comprises: configuring a preamble as comprising a first reference preamble and a second reference preamble, wherein the first reference preamble and the second reference permeable are located in different OFDM symbols. By means of the technical solution of the present invention, accessing solution between the fourth-generation communication system with the third-generation communication system based on the OFDM technology can be realized and the accessing time is shortened.

13 Claims, 8 Drawing Sheets

METHOD FOR CONFIGURING A PREAMBLE AND A METHOD FOR SEARCHING A CELL

FIELD OF THE INVENTION

The present invention relates to the field of communication, in particular to a method for configuring a preamble and a method for searching a cell based on the orthogonal frequency division multiplex technology.

BACKGROUND OF THE INVENTION

The Orthogonal Frequency Division Multiplex (OFDM for short) is a mode of multi-carrier transmission, in which a set of high-speed transmitted data stream is converted into a set of low-speed parallel transmitted data stream to greatly reduce the system's sensitivity to the frequency selectivity of a multipath fading channel, and the introduction of a cyclic prefix further enhances the system's capacity of resistance to the Inter-symbol Interference (ISI for short). In addition, the OFDM also has characteristics such as high bandwidth utilization and simple implementation, which makes it be more and more widely applied in the field of wireless communication.

Herein, the systems based on the OFDM technology comprise: the Wireless Local Area Network (WLAN) system, the 802.16e system based on the orthogonal frequency division multiplex multiple access (a third-generation communication system), the evolved 802.16m system (a fourth-generation communication system) that is the next generation of the 802.16e, and so on.

Since the mobile communication system evolves smoothly, the fourth-generation communication system coexists with the third-generation communication system during a certain period of time for safeguarding the benefits of operators, for example, the 802.16e system will coexist with the 802.16m system.

According to the 802.16e system, a preamble is transmitted in the entire bandwidth of the first symbol of a downlink Moreover, different preambles are respectively used for the 802.16e with different bandwidths (e.g. 5 MHz, 10 MHz, and 20 MHz), however, problems arise that the implementing method is complex and the accessing time is long.

It can be seen that, if just an old preamble is used for achieving access, the performance of a new system will be restricted; on the contrary, if a completely new access channel design is used, the design requirements of compatibility need to be taken into consideration. Two sets of access channels being used in one system certainly causes the increase of the system overhead so as to further influence the overall performance of the system.

SUMMARY OF THE INVENTION

Considering the accessing problem between the third-generation communication system and the fourth-generation communication system based on the orthogonal frequency division multiplex technology existing in the related art, the present invention is proposed. Therefore, the main object of the present invention lies in providing a method for configuring a preamble and a method for searching a cell to solve the above problem.

According to an aspect of the present invention, a method for configuring a preamble is provided, which is applied in an orthogonal frequency division multiplex system of the four-generation communication system compatible with the third-generation communication system.

The method for configuring a preamble according to an embodiment of the present invention includes: configuring a preamble of the fourth-generation communication system as comprising a first reference preamble and a second reference preamble, wherein the first reference preamble and the second reference preamble are located in different OFDM symbols.

Herein, the above first reference preamble has a fixed bandwidth and/or fixed position.

Preferably, the position of the above first reference preamble includes one of the followings: a head of a superframe of the fourth-generation communication system, a head of a radio frame, and a head of the last wireless sub-frame of a radio frame.

Herein, initial position information of the superframe of the fourth-generation communication system is carried in a system broadcast channel of the fourth-generation communication system or carried in a sequence of the first reference preamble.

Preferably, the center of frequency domain of the first reference preamble is aligned with that of the second reference preamble.

Preferably, an offset between the OFDM symbols where the first reference preamble and the second reference preamble are located takes a fixed value or a variable value.

Preferably, the variable value of the offset between the OFDM symbols is carried in the sequence of the first reference preamble.

Herein, center position information of the first reference preamble in the above frequency domain is carried in a system broadcast channel of the fourth-generation communication system.

Preferably, an offset between the system broadcast channel of the above fourth-generation communication system and the first reference preamble takes a fixed value.

Herein, according to system application scenes, the first reference preamble is configured to have different sequences, i.e. the first reference preamble carries information of the system application scenes, wherein the information of the system application scenes is indicated by different sequences of the first reference preamble.

Herein, according to the above system application scenes, the second reference preamble is configured as different sequence groups.

Preferably, the above system application scenes include but are not limited to: the fourth-generation communication system and the third-generation communication system with the same frequency of 5 MHz as the former, the fourth-generation communication system and the third-generation communication system with the same frequency of 10 MHz as the former, and the independently existing fourth-generation communication system.

Herein, when the application scene is the fourth-generation communication system and the third-generation communication system with the same frequency of 5 MHz as the former, the second reference preamble is configured as a preamble of the third-generation communication system with the frequency of 5 MHz; when the application scene is the fourth-generation communication system and the third-generation communication system with the same frequency of 10 MHz as the former, the second reference preamble is configured as a preamble of the third-generation communication system with the frequency of 10 MHz; and when the fourth-generation communication system exists independently, the second reference preamble is configured as a second reference preamble of the fourth-generation communication system.

Preferably, the time repetition cycle of the first reference preamble, the second reference preamble, and the system broadcast channel of the fourth-generation communication system is obtained by dividing a superframe cycle by n, wherein n takes values of 1, 2, 3, 4.

According to another aspect of the present invention, a method for searching a cell is provided. The method is based on the above method for configuring a preamble and is realized by a receiving side.

The method for searching a cell according to an embodiment of the present invention includes: performing an OFDM symbol synchronization and a frame synchronization using the first reference preamble; computing a frequency offset estimation and compensation using the first reference preamble; performing a sequence detection using the autocorrelation of the first reference preamble to determine a system application scene, an offset between the first reference preamble and the second reference preamble, and a fine synchronization of the OFDM symbols; detecting the second reference preamble according to an offset between the first reference preamble and the second reference preamble to obtain a cell identification code and a sector identification code carried in the second reference preamble; detecting the system broadcast channel using the second reference preamble as a reference symbol; and obtaining position information of the superframe according to the first reference preamble.

According to at least one of the above technical solutions of the present invention, a method for hierarchically configuring a preamble is used to realize the accessing solution between the third-generation communication system and the fourth-generation communication system based on the OFDM technology and to shorten the accessing time.

BRIEF DESCRIPTION OF THE DRAWINGS

The drawings described herein provide a further understanding of the present invention and form a part of the description. The drawings together with the embodiments of the present invention are used to explain the present invention without unduly limiting the present invention, wherein.

DETAILED DESCRIPTION OF THE EMBODIMENTS

Functional Summary

In order to realize the co-existence of the fourth-generation communication system and the third-generation communication system, upon designing a new communication system (e.g. the fourth-generation communication system), it needs to take the compatibility with the third-generation mobile communication system into consideration, i.e., a backward compatibility design.

Generally speaking, the compatibility between two systems needs to take the following factors into consideration: parameter compatibility of an air interface system, frame structure coexistence design and network access compatibility.

Herein, the parameter compatibility aims at realizing the frame structure coexistence of the third-generation communication system (e.g. 802.16m) and the fourth-generation communication system (e.g. 802.16e), and the system parameters of the two systems must satisfy a certain relation, for example, the 802.16m system uses a sub-carrier interval compatible with the 802.16e system to ensure the following aspects: the 802.16e systems with different bandwidths may share resources with the 802.16m system in a manner of frequency division (requirements of the frame structure coexistence design); the 802.16e system and the 802.16m system have the same oversampling ratio; and the cyclic prefix (CP for short) length of the 802.16m system is maintained to be compatible with the 802.16e system.

Herein, the frame structure coexistence design aims at realizing that the 802.16e system and the 802.16m system share resources in the manner of Time Division Multiplexing (TDM for short), Frequency Division Multiplexing (FDM), TDM/FDM mixture.

Herein, the network accessing compatibility aims at ensuring that the terminal(s) of the 802.16e system may access the base station(s) of the 802.16m system. For a mobile communication system, a terminal generally accesses a network via a synchronization channel. Normal accessing steps are as follows: (1) performing time and frequency synchronization; (2) detecting a cell identification code (Cell ID); and (3) reading a broadcast message. Following the above steps, the terminal starts a subsequent accessing process based on the information of the broadcast message.

An access process is very important for the mobile communication system, and one important parameter is accessing time. The shorter the accessing time is, the higher the system performance is. However, since the realization of the access relies on a synchronization channel, and compared to a service channel for transmitting user information, the resource occupation of the synchronization channel is an overhead, a balance needs to be achieved between the access performance and the resource occupation of the synchronization channel for a good mobile communication system.

The accessing design of the 802.16m system with backward compatibility needs to at least meet the following requirements: the accessing design of the 802.16e system is needed to ensure a smooth access for the terminal(s) of the 802.16e system; the terminal(s) of the 802.16m system can also access smoothly, and at the same time, the accessing performance of the 802.16m system shall be higher as compared with that of the 802.16e system; and the overhead of the synchronization channel design of the 802.16m is relatively low.

Based on the above conditions, the present invention provides a method for configuring a preamble of the fourth-generation communication system to solve the accessing problem between the 802.16e system and the 802.16m system.

In the case that no conflict arises, the embodiments of the present application and the features of the embodiments can be combined with one another.

Herein after, the present invention will be described in detail with reference to the drawings.

Method Embodiment 1

According to an embodiment of the present invention, a method for configuring a preamble is provided, which is applied in an OFDM system.

The method for configuring a preamble includes: configuring the preamble of the fourth-generation system as comprising a first reference preamble and a second reference preamble, wherein the first reference preamble and the second reference preamble are located in different OFDM symbols.

By means of the technical solution provided in the embodiment of the present invention, the accessing compatibility problem between the third-generation communication system and the fourth-generation communication system based on the OFDM technology can be solved.

Herein, the preamble configuration uses a hierarchical technique to divide the preamble of the 802.16m system into a p-preamble (viz. the first reference preamble hereinabove) and an s-preamble (viz. the second reference preamble hereinabove).

Herein, the bandwidth of the p-preamble is a fixed bandwidth, for example, 5 MHz, with a structure of L times repetition in the time domain, wherein L can be 2, 4 and so on, and the corresponding frequency structure is inserting a p-preamble sequence with an interval of L−1 subcarriers.

The above p-preamble and the preamble of the 802.16e use a fixed time interval of P-offset. The P-offset can use an OFDM symbol as a unit, and can also use a sub-frame as a unit. Moreover, the P-offset may take a fixed value or can be configured on demand. When the P-offset is configurable, the P-offset information may be carried in the p-preamble sequence.

The position of the above p-preamble is fixed, which may be a head of a radio frame, a head of a superframe, or other positions as required.

Herein, the s-preamble can use three times repetition in the time domain, i.e., one is inserted with an interval of two frequency domain sub-carriers.

Preferably, the center of the frequency domain of the above p-preamble is aligned with that of the above s-preamble, and the center position information is carried in a system broadcast channel (BCH for short).

Preferably, an offset between the OFDM symbols in which the above p-preamble and s-preamble are located takes a fixed value or a variable value.

Preferably, the time repetition cycle of the above p-preamble, s-preamble and BCH may either be n times of a frame cycle or 1/m of a superframe cycle, wherein m, n=1, 2, ..., i.e., both m and n take natural numbers. Preferably, the number of times the p-preamble appears in a superframe cycle is set to be n, wherein n takes values of 1, 2, 3, 4; and/or the number of times the s-preamble appears in a superframe cycle is set to be n, wherein n takes values of 1, 2, 4; and/or the number of times the BCH of the fourth-generation communication system appears in a superframe cycle is set to be n, wherein n takes values of 1, 2, 3, 4.

Preferably, the bandwidth of the above BCH is equal to that of the p-preamble, and an offset between the two takes a fixed value.

Preferably, the initial position information of the above superframe can be carried in the BCH or carried in the p-preamble sequence.

Hereinafter, an IEEE 802.16e system which is an old system (i.e., the third generation system) and an IEEE 802.16m system which is a new system (i.e., the fourth generation system) are taken as examples to describe the present invention.

The 802.16e is a protocol using the orthogonal frequency division multiplex technology, wherein it is stipulated an implementation solution for a preamble accessing, including OFDM symbol synchronization, frame synchronization (marking the start of one frame), and cell identification code (Cell ID) detection, wherein it is stipulated in the protocol that the preamble occupies one symbol in the time domain and is constituted by subcarrier(s) in the frequency domain, that 114 specific pseudo-random sequence (PN sequence, a different sequence identifying a different Cell ID) are modulated into a subcarrier using a Binary Phase Shift Keying method (BPSK), and that one bit of a certain PN sequence is modulated with an interval of three subcarriers.

In the 802.16e OFDM system, a radio frame is divided into a plurality of OFDM symbols, the length of one radio frame is a definite value of 5 milliseconds, and the preamble is located in the first OFDM symbol of each frame.

In the 802.16m OFDM system, the length of one radio frame is the same as that of the 802.16e frame, i.e., 5 ms. Each radio frame is divided into eight subframes, the eight subframes are divided into successive downlink subframes and uplink subframes, and each subframe contains six OFDM symbols. Four radio frames constitute a superframe, thus the length of one superframe is 20 milliseconds.

In an operation mode of the 802.16m and the 802.16e mixed in the same frequency, a time division multiplex manner is used, i.e. in each radio frame, part of the time is used for the 802.16e system, while the remaining time is used for the 802.16m system. The bandwidths of the 802.16e system mixing with the 802.16m in the same frequency are 5 MHz and 10 MHz.

The cycle of a synchronization channel takes 10 ms as an example, i.e. a synchronization cycle contains two radio frames of 5 ms.

Embodiment 1

The preamble configuration is explained with a system scene as an example in which the frame structures of the 802.16m and 802.16e with a bandwidth of 5 MHz coexists.

Figure 1:
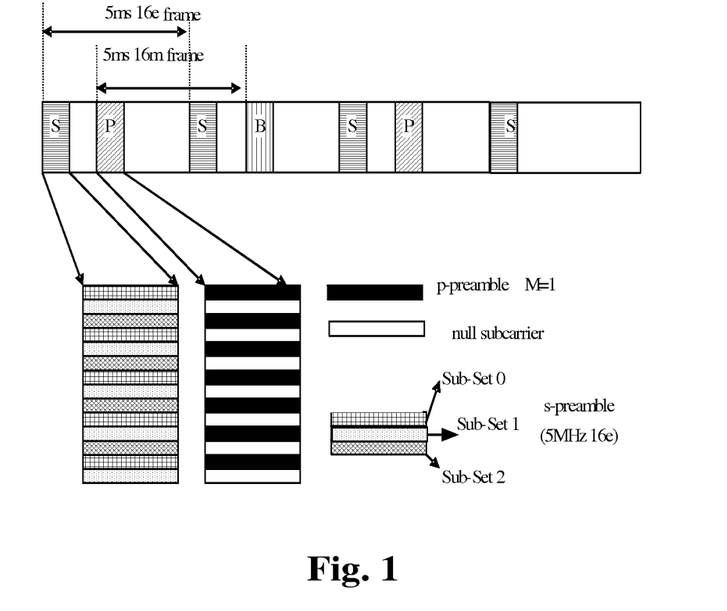
FIG. 1 is a schematic diagram of a preamble structure in a case that the frame structures of the 802.16m and the 802.16e with a bandwidth of 5 MHz coexist according to Method Embodiment 1 of the present invention.

FIG. 1 is a schematic diagram of a preamble structure in the case that the frame structures of the 802.16m and the 802.16e with a bandwidth of 5 MHz coexist. In terms of the time domain, the p-preamble (i.e. the first reference preamble hereinabove) is located in a fixed symbol of each frame, the s-preamble (i.e. the second reference preamble hereinabove) is located in the first symbol of the first radio frame, the s-preamble is a preamble of the 802.16e with a bandwidth of 5 MHz, and the system broadcast channel (BCH) is located in the first symbol of the second radio frame, the bandwidth being fixed as 5 MHz.

In terms of the frequency domain, the p-preamble is modulated on a useful subcarrier with a bandwidth of 5 MHz, and modulated with an interval of L−1 subcarriers, for example, provided that L=2 or 4, if L=2, the modulation is performed on the odd-number subcarriers or the even-number subcarriers; the s-preamble can be modulated on a useful subcarrier with a bandwidth of 5 MHz and modulated with an interval of two subcarriers.

Herein, the structures of the p-preamble sequence can be divided into three types, i.e. M=1, 2, 3, wherein M=1 indicates that the s-preamble is a preamble of the 802.16e with a bandwidth of 5 MHz, M=2 indicates the s-preamble is a preamble of the 802.16e with a bandwidth of 10 MHz, M=3 indicates that the s-preamble is a new sequence of the 802.16m with a bandwidth of 5 MHz, and the new sequence may be a different sequence from the preamble of the 802.16e or the same sequence as the preamble of the 802.16e. As shown in following Table 1, there is a schematic diagram of the structures of the p-preamble sequence and the s-preamble sequence.

TABLE 1 the structures of the p-preamble sequence and the s-preamble sequence

| p-preamble sequence | s-preamble sequence | s-preamble sequence subcarrier mapping |
|---|---|---|
| M = 1 | 5M 16ePreamble sequence | Settor 1, the initial position of subcarrier Sub-set = 0 |
| M = 1 | 5M 16ePreamble sequence | Settor 2, the initial position of subcarrier Sub-set = 1 |
| M = 1 | 5M 16ePreamble sequence | Settor 3, the initial position of subcarrier Sub-set = 2 |
| M = 2 | 5M 16ePreamble sequence | Settor 1, the initial position of subcarrier Sub-set = 0 |
| M = 2 | 5M 16ePreamble sequence | Settor 2, the initial position of subcarrier Sub-set = 1 |
| M = 2 | 5M 16ePreamble sequence | Settor 3, the initial position of subcarrier Sub-set = 2 |
| M = 3 | 5M 16 m | |

In the case that the s-preamble is a preamble of the 802.16e with a bandwidth of 5 MHz, the s-preamble has 114 sequences in total, which are divided into three groups, each group corresponds to one sector of a cell, and the s-preamble of each sector is modulated on the initial position of the subcarrier with a different offset, for example, sector 1 is modulated on the subcarriers 1, 4, 7, etc., sector 2 is modulated on the subcarriers 2, 5, 8, etc., and sector 3 is modulated on the subcarriers 3, 6, 9, etc.

Figure 2:
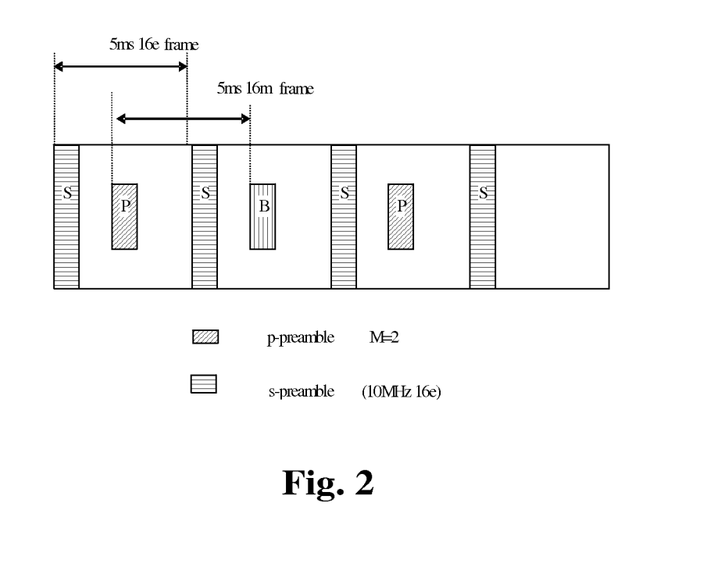
FIG. 2 is a schematic diagram of a preamble structure in a case that the frame structures of the 802.16m and the 802.16e with a bandwidth of 10 MHz coexist according to Method Embodiment 1 of the present invention.

FIG. 2 is a schematic diagram of a preamble structure in a case that the frame structures of the 802.16m and the 802.16e with a bandwidth of 10 MHz coexist. In terms of the time domain, the position relations of the p-preamble, the s-preamble, and the BCH are identical to FIG. 1. No detailed description is made herein.

The sequence number of the p-preamble may be M=2, the modulation on the subcarrier is the same as FIG. 1, and the s-preamble grouping and the subcarrier modulation manner are the same as FIG. 1. No detailed description is made herein.

Figure 3:
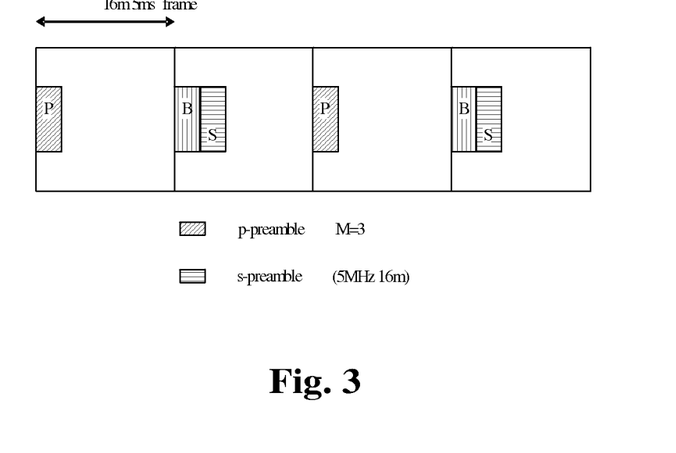
FIG. 3 is a schematic diagram of a preamble structure in a case that the frame structure of the 802.16m exists independently according to Method Embodiment 1 of the present invention.

FIG. 3 is a schematic diagram of a preamble structure in a case that the 802.16m system exists independently. In terms of the time domain, the p-preamble is located in the first symbol of the first radio frame; the s-preamble is located in the second symbol of the second radio frame and is represented by a newly designed 802.16m s-preamble sequence, and the BCH is located in the first symbol of the second radio frame.

Herein, the sequence number of the p-preamble may be M=3, the modulation on the subcarrier is the same as FIG. 1, and the s-preamble grouping and the subcarrier modulation manner are the same as FIG. 1. No detailed description is made herein.

Figure 4:
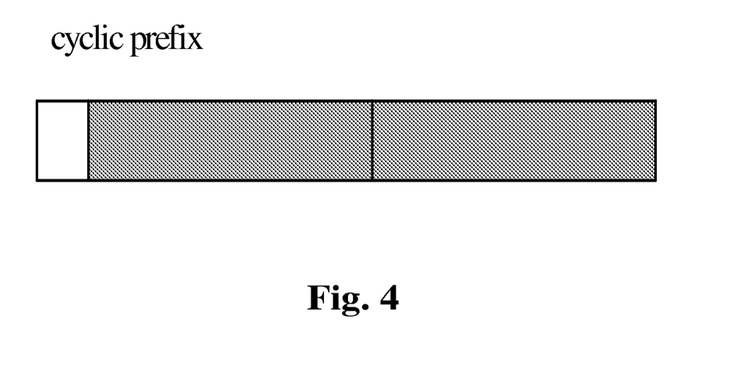
FIG. 4 is a schematic diagram of a time domain structure of an OFDM symbol where a first reference preamble is located according to Method Embodiment 1 of the present invention.

FIG. 4 is a structural diagram of the time domain of an OFDM symbol where the p-preamble is located in the case L=2. Since a manner of subcarrier insertion with interval in the frequency domain is used for the p-preamble, a former part and a latter part, which are identical, are formed in one OFDM symbol in the time domain, wherein the former part of the OFDM is a cyclic prefix of the OFDM symbol for eliminating multi-path influence of wireless channel transmission.

Herein, the position information of the BCH and the superframe head in the BCH is read to obtain the initial position of the superframe and frame synchronization.

Embodiment 2

The preamble configuration is explained with a system scene as an example in which the frame structures of the 802.16m and the 802.16e with a bandwidth of 5 MHz coexist. The example is distinguished from Embodiment 1 mainly in the different position relationships between the p-preamble and the BCH. Provided that the 5 ms radio frame contains four downlink subframes and four uplink subframes, herein the implementation manner of the coexistence of the frame structures of the 802.16m and the 802.16e with a bandwidth of 10 MHz is the same as the coexistence of the frame structures of the 802.16m and the 802.16e with a bandwidth of 5 MHz, and the sole difference is that the s-preamble has a bandwidth of 10 MHz and a structure of a preamble sequence of the 802.16e with a bandwidth of 10 MHz.

Figure 5:
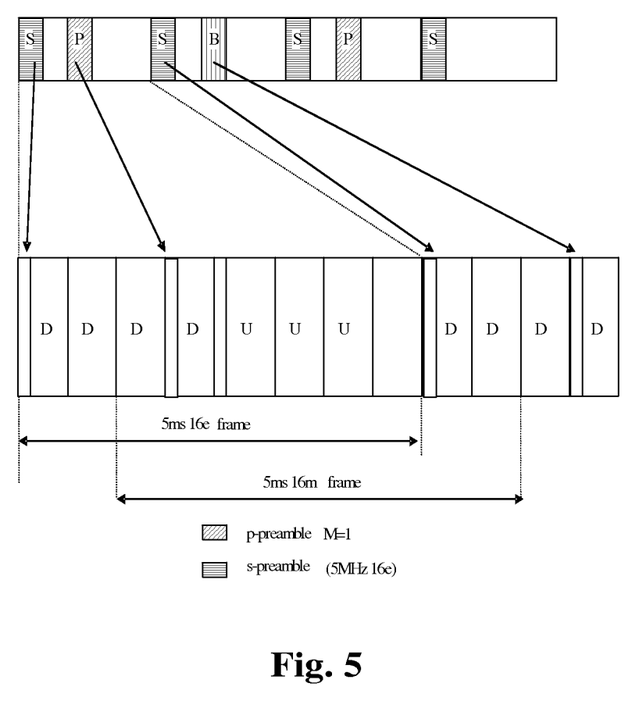
FIG. 5 is a schematic diagram of a preamble structure in a case that the frame structures of the 802.16m and the 802.16e with a bandwidth of 5 MHz according to Method Embodiment 2 of the present invention.

FIG. 5 is a schematic diagram of a preamble structure in a case that the frame structures of the 802.16m and the 802.16e with a bandwidth of 5 MHz coexist. In terms of the time domain, the p-preamble is located in the first symbol of the last downlink subframe of the first radio frame, the s-preamble is located in the first symbol of the first radio frame, and is a preamble of the 802.16e with a bandwidth of 5 MHz, and the BCH is located in the first symbol of the last downlink subframe of the second radio frame, the bandwidth being fixedly 5 MHz.

Figure 6:
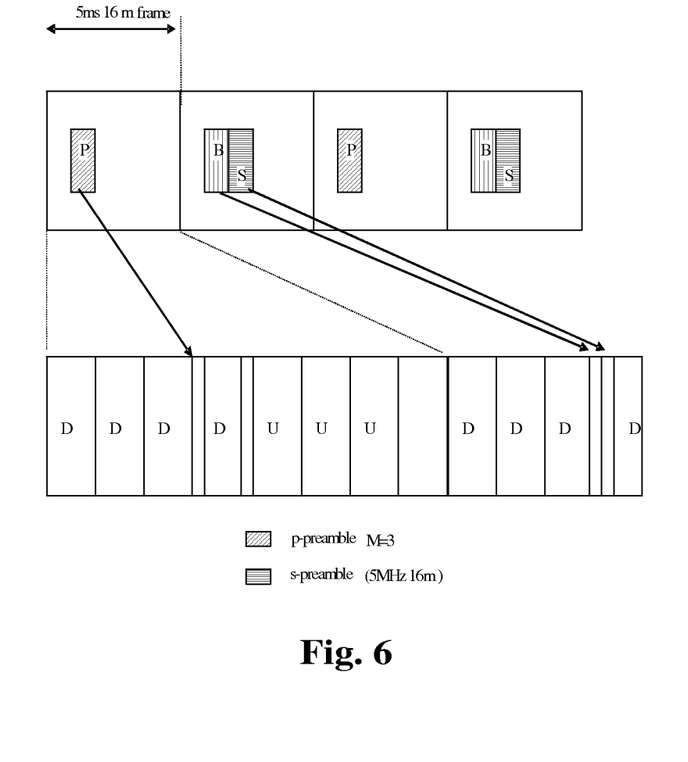
FIG. 6 is a schematic diagram of a preamble structure in a case that the frame structure of the 802.16m existed independently according to Method Embodiment 2 of the present invention.

FIG. 6 is a schematic diagram of a preamble structure in a case that the 802.16e system exists independently. In terms of the time domain, the p-preamble is located in the first symbol of the last downlink subframe of the first radio frame, the s-preamble is located in the second symbol of the last downlink subframe of the second radio frame, and is a newly designed 802.16m s-preamble sequence, and the BCH is located in the first symbol of the last downlink subframe of the second radio frame, the bandwidth being fixed as 5 MHz.

As shown in FIG. 4, in a 20 ms superframe, a time domain signal of the first p-preamble is +A+A, i.e., a structure with two identical former and latter segments, wherein A indicates a signal of which the first segment and the second segment are the same, and + indicates the polarity of the signal; a time domain signal of the second p-preamble is +A−A, i.e., indicating the polarities of the first segment signal and the second segment signal are converse. Thus, the initial position of the superframe can be determined by detecting the polarities of the first segment signal and the second segment signal of the time domain signal of the p-preamble.

Embodiment 3

The preamble configuration is described in detail in Embodiment 3 with the system scene as an example in which the 802.16m system exists independently.

Figure 7:
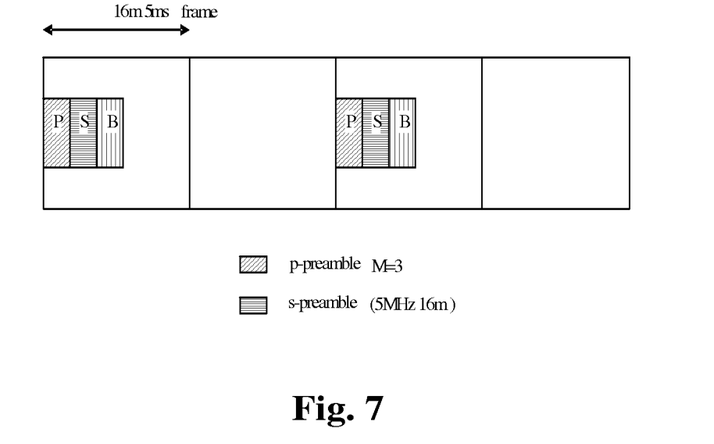
FIG. 7 is a schematic diagram of a preamble structure in a case that the frame structure of the 802.16m existed independently according to Method Embodiment 3 of the present invention.

FIG. 7 is a schematic diagram of a preamble structure in the case that the 802.16m system exists independently. In terms of the time domain, the p-preamble is located in the first symbol of the first downlink subframe of the first radio frame, the s-preamble is located in the second symbol of the first downlink subframe of the first radio frame, and is a preamble of the 802.16m with a bandwidth of 5 MHz, and the BCH is located in the third symbol of the first downlink subframe of the first radio frame, the bandwidth being fixed as 5 MHz.

Embodiment 4

Embodiment 4 is identical to Embodiment 3, the system scenes both being that the 802.16m system exists independently. Embodiment 4 is distinguished from Embodiment 3 mainly in the different position relationships between the p-preamble, the s-preamble, and the BCH in the radio frame.

Figure 8:
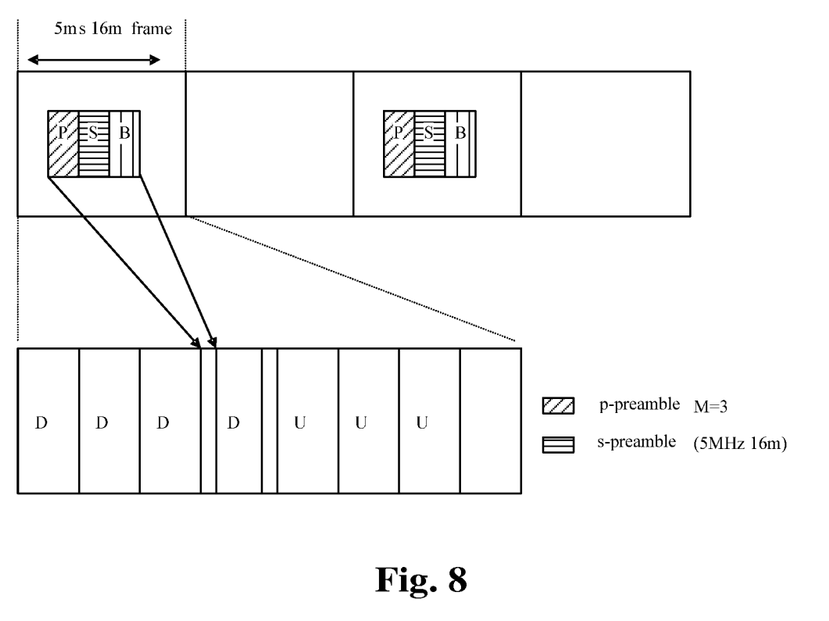
FIG. 8 is a schematic diagram of a preamble structure in a case that the frame structure of the 802.16m existed independently according to Method Embodiment 4 of the present invention.

FIG. 8 is a schematic diagram of a preamble structure in the case that the 802.16m system exists independently. In terms of the time domain, the p-preamble is located in the first symbol of the last downlink subframe of the first radio frame, the s-preamble is located in the second symbol of the last downlink subframe of the first radio frame, and is a preamble of the 802.16m with a bandwidth of 5 MHz, and the BCH is located in the third symbol of the last downlink subframe of the first radio frame, the bandwidth being fixedly 5 MHz.

Figure 9:
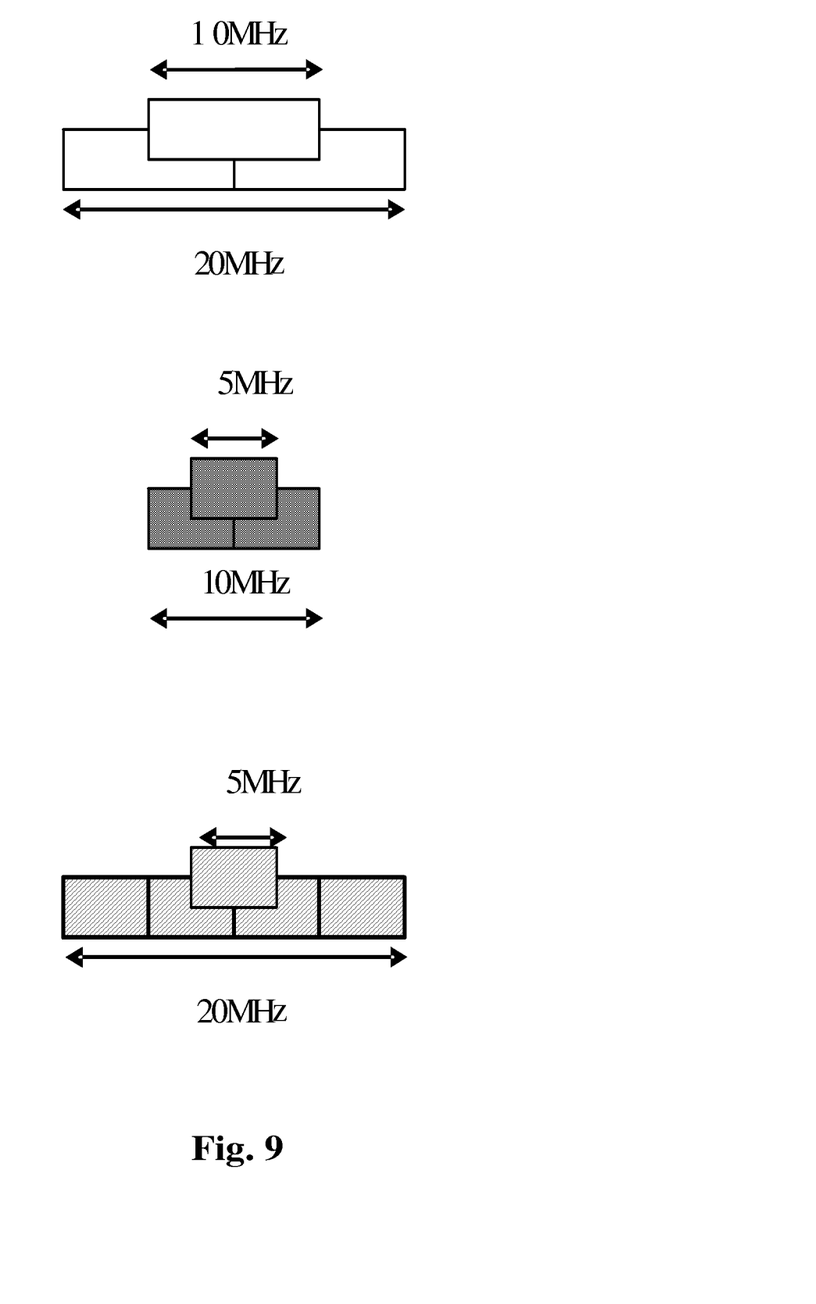
FIG. 9 is a schematic diagram of an allocated position (frequency domain) of a preamble in systems with different bandwidths according to the method embodiments of the present invention.

FIG. 9 is a schematic diagram of a possible allocated position (frequency domain) of the p-preamble in systems with different bandwidths. As for a 5M bandwidth preamble of a 20 MHz bandwidth system, five positions may be provided. As for a 10M bandwidth preamble of a 20 MHz bandwidth system, three positions may be provided. As for a 5M bandwidth preamble of a 10 MHz bandwidth system, three positions may be provided. The information of the final allocated position of the preamble in the system is carried by the system broadcast message, the position information is sent to a mobile terminal, and the mobile terminal determines a frequency range of the system bandwidth based on the position information.

Method Embodiment 2

According to an embodiment of the present invention, a method for searching a cell is provided, the method being based on the method for configuring a preamble in the first method embodiment above.

Figure 10:
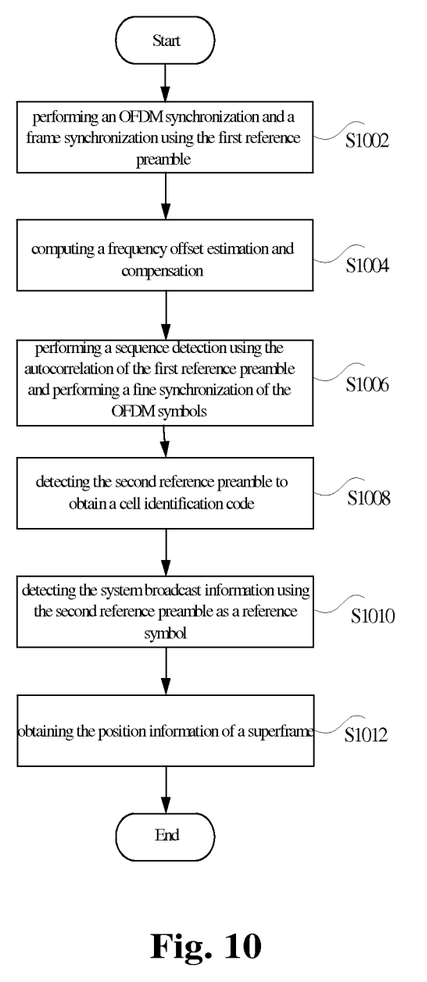
FIG. 10 is a flow chart of a method for searching a cell according to Method Embodiment 5 of the present invention.

FIG. 10 is a flow chart of a method for searching a cell according to an embodiment of the present invention. As shown in FIG. 10, the method includes the following steps (step S1002 to step S1012).

Step S1002: a receiving side performs an OFDM symbol synchronization and a frame synchronization using the first reference preamble.

Step S1004: the receiving side computes a frequency offset estimation and compensation using the first reference preamble, i.e., computing the frequency offset estimation and compensation of the receiving side and a sending side using the first reference preamble, for example, the receiving side may be a terminal, and the sending side may be a base station.

Step S1006: the receiving side performs a sequence detection using the autocorrelation of the first reference preamble to determine the following three parameters: a system application scene, an offset between the first reference preamble and the second reference preamble, and a fine synchronization of the OFDM symbols.

Step S1008: the receiving side detects the second reference preamble at the position of the second reference preamble according to the offset between the first reference preamble and the second reference preamble and obtains a cell identification code and a sector identification code of the second reference preamble.

Step S1010: the receiving side uses the second reference preamble as a reference symbol to detect the system broadcast channel.

Step 1012: the receiving side obtains the position information of a superframe according to the first reference preamble.

By means of the technical solution provided in the embodiment of the present invention, a method for searching a cell in the case that the third-generation communication system and the fourth-generation communication system coexist and a method for searching a cell in the case that the fourth-generation communication system exists independently are achieved.

Embodiment 5

Figure 11:
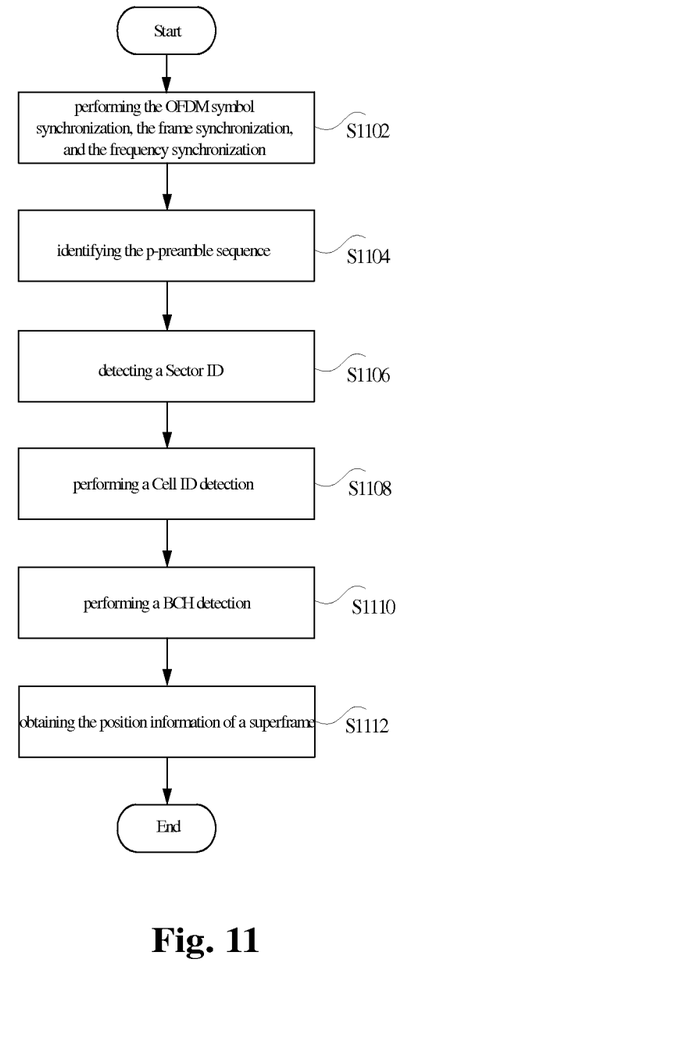
FIG. 11 is a flow chart of a detailed process in a method for searching a cell according to Method Example 5 of the present invention.

As shown in FIG. 11, on the mobile station side, a process for searching a cell of the mobile station includes the following steps (step S1102 to step S1112).

Step S1102: the OFDM symbol synchronization, the frame synchronization, and the frequency synchronization are performed. Specifically, the mobile station extracts the position of a synchronization signal (i.e., a p-preamble symbol) from received data and performs the frame synchronization and the OFDM symbol synchronization simultaneously. The frame synchronization techniques and the OFDM symbol synchronization techniques are techniques well known to the person skilled in the art, and thus no redundant description is made herein. Herein, a subframe synchronization signal generally has a certain characteristic, for example, the characteristic of the symmetry in the time domain as shown in FIG. 4, etc. and thus is easy to be extracted. The frequency offset estimation and compensation is performed using the p-preamble symbol in the frequency synchronization. The frequency offset estimation algorithm refers to the algorithm well known to the person skilled in the art, and thus no redundant description is made herein.

Step S1104: the p-preamble sequence is identified. An OFDM symbol where the p-preamble is located is extracted using the frame synchronization and the OFDM symbol synchronization information and then is performed with a discrete Fourier conversion. An identification signal M of the p-preamble sequence is extracted from the converted data to obtain the type of the s-preamble used by the cell.

Step S1106: a Sector ID is detected. An s-preamble is obtained using the frame frequency, the OFDM symbol synchronization information, and the information of an offset between the positions of the p-preamble and the s-preamble in a case that M takes different values, and is performed with a discrete Fourier conversion. A sector ID is determined from the converted data according to the power capability of subcarriers with different offsets.

Herein, the information of the offset between the positions of the p-preamble and the s-preamble is carried in a p-preamble sequence, for example, the p-preamble is modulated with an interval of L subcarriers. Thus, the p-preamble time domain is a signal with L identical segments, for example, if L=4, it is denoted by ±A±A±A±A, wherein + and − indicate the polarities of respective segments. Provided that the polarities of the first segment to the fourth segment are [n1 n2 n3 n4], different combinations of n1 to n4 indicate different offsets, FIG. 2 shows fixed positions corresponding to different combinations of n1 to n4.

TABLE 2 offsets corresponding to different combinations of n1 to n4

| [n1 n2 n3 n4] | Offset (fixed position) |
| --- | --- |
| + + + + | Offset = 1 |
| + + + − | Offset = 2 |
| + + − − | Offset = 3 |

Step S1108: a Cell ID detection is performed. A Cell ID corresponding to the s-preamble sequence is obtained by performing sequence matching on the subcarrier of an offset corresponding to the Cell ID according to the determined Sector ID.

Step S1110: a BCH detection is performed. An OFDM symbol where the BCH is located is obtained using the frame synchronization, the information of the OFDM symbol synchronization, and the information of the offset between the p-preamble and the BCH, and is performed with a discrete Fourier conversion. The BCH information is extracted from the converted data using the parsed s-preamble sequence as a reference symbol.

Step S1112: the position information of a superframe is obtained. Wherein the initial position of the superframe is obtained by one of the following three manners:

Manner 1: the initial position of the superframe is obtained by reading the position information of the BCH and the superframe head in the BCH.

Manner 2: as shown in FIG. 4, in a 20 ms superframe, the time domain signal of the first p-preamble is +A+A, i.e., a structure with two identical former and latter segments, wherein A indicates a signal of which the first segment and the second segment are the same, and + indicates the polarity of the signal; the time domain signal of the second p-preamble is +A−A, i.e., indicating the polarities of the first segment signal and the second segment signal are converse. Thus, the initial position of the superframe can be determined by detecting the polarities of the first segment signal and the second segment signal of the time domain signal of the p-preamble.

Manner 3: the position relation between the p-preamble and the BCH is predetermined, for example, it can be predetermined that the position of the p-preamble is adjacent to that of the BCH, thus, the receiving side can determine the position of the BCH according to the p-preamble position.

In the above embodiments, a method for searching a cell is realized in the case that the third-generation communication system and the fourth-generation communication system coexist or in the case that the fourth-generation communication system exists independently.

It needs to explain that, the embodiments of the present invention are described only with reference to the examples of the IEEE 802.16e system as the third-generation system and the IEEE 802.16m system as the fourth-generation system, but are not limited thereto. Carrying out the method of the present using other systems as the third-generation system and the fourth-generation system still falls within the scope of protection of the present invention.

As described above, through the method for configuring a preamble and the method for searching a cell provided by the present invention, a hierarchical preamble configuration is used, such that the accessing time is short; the access of an old system is compatible, the terminal of the old system can access normally, and a new system can access in a new manner, overcoming the problem arising from the access of the old system and reducing the cost of the system; and moreover, the method for configuring a preamble according to the embodiments of the present invention supports the expandability of the bandwidth of the 802.16m system, i.e., the bandwidth of the 802.16m is 5 MHz to 20 MHz, and the bandwidth of the system is greater than 20 MHz. In addition, the configuring method also supports a UE with a different bandwidth and supports the preamble of the 802.16e. The configuring method used for a system where the 802.16m and the 802.16e coexist may multiplex the preamble of the 802.16e, the spectrum efficiency of which is high.

Certainly, the present invention also has other various embodiments, the person skilled in the art would make corresponding variation and modification based on the present invention without departing from the spirit and principle of the present invention. However, the corresponding variation and modification fall within the scope of protection of the claims appended in the present invention.

The descriptions above are only preferable embodiments of the present invention, which are not used to restrict the present invention. For the person skilled in the art, the present invention may have various changes and variations. Any modifications, equivalent substitutions, improvements etc. within the spirit and principle of the present invention shall all be included in the scope of protection of the present invention.

What is claimed is:

1. A method for configuring a preamble, used in an orthogonal frequency division multiplex, OFDM, system of a fourth-generation communication system compatible with a third-generation communication system, wherein the third-generation communication system is 802.16e and the fourth-generation communication system is 802.16m, comprising:

configuring, by a base station, a preamble of the fourth-generation communication system as comprising a first reference preamble and a second reference preamble, wherein the first reference preamble and the second reference preamble are located in different OFDM symbols;

wherein the first reference preamble carries information of system application scenes, and the information of the system application scenes is indicated by different sequences of the first reference preamble;

the system application scenes comprises: the fourth-generation communication system and the third-generation communication system using the same frequency of 5 MHz as the fourth-generation communication system, the fourth-generation communication system and the third-generation communication system using the same frequency of 10 MHz as the fourth-generation communication system, and the fourth-generation communication system existing independently; and the base station transmitting the configured preamble of the fourth-generation communication system.

2. The method according to claim 1, wherein the first reference preamble has a fixed bandwidth and/or a fixed position.

3. The method according to claim 1, wherein the position of the first reference preamble includes one of the followings: a head of a superframe of the fourth-generation communication system, a head of a radio frame, and a head of the last wireless sub-frame of a radio frame.

4. The method according to claim 3, wherein initial position information of the superframe of the fourth-generation communication system is carried in a system broadcast channel of the fourth-generation communication system or carried in a sequence of the first reference preamble.

5. The method according to claim 1, wherein the center of frequency domain of the first reference preamble is aligned with that of the second reference preamble.

6. The method according to claim 1, wherein an offset between the OFDM symbols where the first reference preamble and the second reference preamble are located takes a fixed value or a variable value.

7. The method according to claim 6, wherein the variable value of the offset between the OFDM symbols is carried in the sequence of the first reference preamble.

8. The method according to claim 5, wherein center position information of the first reference preamble in the frequency domain is carried in a system broadcast channel of the fourth-generation communication system.

9. The method according to claim 8, wherein an offset between the system broadcast channel of the fourth-generation communication system and the first reference preamble takes a fixed value.

10. The method according to claim 1, wherein according to the system application scenes, the second reference preamble is configured as different sequence groups.

11. The method according to claim 1, wherein
when the application scene is the fourth-generation communication system and the third- generation communication system using the same frequency of 5 MHz as the fourth-generation communication system, the second reference preamble is configured as a preamble of the third-generation communication system with the frequency of 5 MHz;
when the application scene is the fourth-generation communication system and the third- generation communication system using the same frequency of 10 MHz as the fourth-generation communication system, the second reference preamble is configured as a preamble of the third-generation communication system with the frequency of 10 MHz; and
when the fourth-generation communication system exists independently, the second reference preamble is configured as a second reference preamble of the fourth-generation communication system.

12. The method according to claim 11, wherein
the number of times the first reference preamble occurs in a superframe cycle is n, wherein n takes values of 1, 2, 3, 4; and/or
the number of times the second reference preamble occurs in a superframe cycle is n, wherein n takes values of 1, 2, 4; and/or
the number of times the system broadcast channel of the fourth-generation communication system occurs in a superframe cycle is n, wherein n takes values of 1, 2, 3, 4.

13. A method for searching a cell, using the method for configuring a preamble according to claim 1, comprising:
performing an OFDM symbol synchronization and a frame synchronization using the first reference preamble;
computing a frequency offset estimation and compensation using the first reference preamble;
performing a sequence detection using the autocorrelation of the first reference preamble to determine a system application scene, an offset between the first reference preamble and the second reference preamble, and a fine synchronization of the different OFDM symbols;
detecting the second reference preamble according to an offset between the first reference preamble and the second reference preamble to obtain a cell identification code and a sector identification code carried in the second reference preamble;
detecting a system broadcast channel using the second reference preamble as a reference symbol; and
obtaining position information of a superframe according to the first reference preamble.

* * * * *